US011849401B2

(12) United States Patent
Chandra et al.

(10) Patent No.: US 11,849,401 B2
(45) Date of Patent: Dec. 19, 2023

(54) ENERGY EFFICIENT NETWORK CONNECTIVITY MAXIMIZATION

(71) Applicant: Microsoft Technology Licensing, LLC, Redmond, WA (US)

(72) Inventors: Ranveer Chandra, Bellevue, WA (US); John Charles Krumm, Redmond, WA (US); Xia Zhou, Hanover, NH (US); Stefan Saroiu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 353 days.

(21) Appl. No.: 17/122,882

(22) Filed: Dec. 15, 2020

(65) Prior Publication Data

US 2021/0176705 A1    Jun. 10, 2021

Related U.S. Application Data

(60) Continuation of application No. 15/660,826, filed on Jul. 26, 2017, now abandoned, which is a division of application No. 13/407,181, filed on Feb. 28, 2012, now Pat. No. 9,756,571.

(51) Int. Cl.
*H04W 52/02* (2009.01)

(52) U.S. Cl.
CPC ..... *H04W 52/028* (2013.01); *H04W 52/0229* (2013.01); *Y02D 30/70* (2020.08)

(58) Field of Classification Search
CPC . H04W 52/028; H04W 52/0229; Y02D 30/70
See application file for complete search history.

(56) References Cited

U.S. PATENT DOCUMENTS

| | | | | |
|---|---|---|---|---|
| 2006/0146834 A1* | 7/2006 | Baker | ................ | H04W 52/028 370/395.53 |
| 2006/0280128 A1* | 12/2006 | Abdel-Kader | ........ | H04W 48/16 370/254 |
| 2007/0060125 A1* | 3/2007 | Rahim | .................. | H04W 48/16 455/436 |
| 2011/0059779 A1* | 3/2011 | Thomas | ............ | H04W 52/0209 455/574 |

* cited by examiner

*Primary Examiner* — Marcos L Torres
(74) *Attorney, Agent, or Firm* — Schwegman Lundberg & Woessner, P.A.

(57) ABSTRACT

The minimization of the amount of power consumed by an electronic device in acquiring or maintaining network connectivity with a network may extend the battery life of the electronic device. When the electronic device has established a communication connection with a wireless access point, the electronic device cycles a network interface controller of the electronic device between a power on state and a power off state without terminating the communication connection. Accordingly, the electronic device powers on a main processor of the electronic device when the network interface controller detects a beacon during the power on state that indicates the wireless access point has a buffered data frame for the electronic device.

20 Claims, 7 Drawing Sheets

ENERGY EFFICIENT NETWORK CONNECTIVITY MAXIMIZATION

RELATED APPLICATION

This application is a continuation of U.S. patent application Ser. No. 15/660,826, filed on Jul. 26, 2017, which application is a divisional of and claims priority to U.S. patent application Ser. No. 13/407,181 filed on Feb. 28, 2012, the disclosures of each of which are incorporated herein by reference in their entirety.

BACKGROUND

A networked electronic device typically includes a wireless transceiver that enables the electronic device to transmit data and receive data from other devices over a network. In many instances, the wireless transceiver may be a wireless network interface controller (NIC) that includes a Wireless Fidelity (Wi-Fi) IEEE 802.11 radio. The Wi-Fi radio may enable the electronic device to connect to the Internet via multiple wireless network access points, also known as hotspots, which may be distributed over a geographical area. However, the communication range of each wireless network access point is generally limited, which may pose a problem when the electronic device is a mobile device that is frequently carried to many different locations by a user.

For example, in order to maximize the time for which a mobile electronic device is connected to the network, the network interface controller and the main processor of the electronic device may remain powered on even when no data is being communicated over the network. The constant powering of the network interface controller and the main processor may enable the electronic device to conduct searches for new wireless access points as current wireless access points recede out of range. These searches for new wireless access points as the electronic device travels through different geographic areas may prematurely deplete the battery of the electronic device due to the constant power consumption by the network interface controller and the main processor.

Alternatively, the user of the electronic device may manually power off the network interface controller of the electronic device, and then periodically turn on the network interface controller to search for new wireless access points at each new geographical location. However, such efforts may be cumbersome and inefficient as the user may experience time delays associated with the initiation and performance of each new search. Further, applications on the electronic device that rely on push data, such as email programs and instant messaging programs, may not promptly receive new data due to the network interface controller being temporarily disabled.

SUMMARY

Described herein are techniques for maximizing the network connectivity of an electronic device while minimizing the amount of power consumed by the electronic device in acquiring or maintaining the communication connection. The electronic device may be a mobile electronic device. The electronic device may use a Wi-Fi transceiver to connect to a network, such as the Internet. The wireless transceiver may be a wireless network interface controller (NIC) that includes a Wi-Fi radio. The electronic device may use the network interface controller and the main processor of the electronic device to not only communicate data over the network, but also to search for new wireless access points as the mobile electronic device moves about different geographical regions. Accordingly, the network interface controller and the main processor of the electronic device may consume considerable power while acquiring or maintaining network connectivity to the network.

In a scenario in which the electronic device is attempting to acquire network connectivity with a wireless access point, power consumption may be minimized by powering off the main processor of the electronic device, and periodically powering on the network interface controller to search for one or more wireless access points that are pre-selected based on a usage context of the electronic device. Thus, since the network interface controller generally consume less power than the main processor of the electronic device, periodically powering on the network interface controller while the main processor is powered off may reduce overall energy consumption, In such a scenario, the electronic device may select at least one wireless access point identifier for inclusion in a list of wireless access point identifiers and populate the network interface controller memory with the list. The at least one access point identifier may be selected based at least on contextual data related the electronic device using the main processors. The electronic device may then power off the main processor. The electronic device may further periodically cycle the network interface controller between a power on state and a power saving state, so that the network interface controller may perform a scan for wireless access points that match the wireless access point identifiers during the power on state. In some instances, such a scan for wireless access points that match the wireless access point identifiers in the list may consume less energy than a scan for any available wireless access point. The electronic device may additionally power on the main processor in response to the network interface controller detecting a wireless access point that matches a corresponding wireless access point identifier in the network interface controller memory.

In another scenario in which the electronic device is connected to a wireless access point, power consumption may be minimized by using different techniques. In at least one instance, the electronic device may cycle a network interface controller of the electronic device between a power on state and a power off state without terminating the communication connection. Accordingly, the electronic device may further power on a main processor of the electronic device when the network interface controller detects a beacon during the power on state that indicates the wireless access point has a buffered data frame for the electronic device.

In another instance, power consumption minimization may include powering of the main processor of the electronic device, and placing the network interface controller into a power saving state for time intervals that vary according to a robustness of the communication connection between the wireless access point and the electronic device. In such an instance, the electronic device may calculate an adaptive sleep interval for a network interface controller of the electronic device based on a robustness of the communication connection. The electronic device may then switch the network interface controller of the electronic device from a power saving state that lasts the adaptive sleep interval to a power on state. Accordingly, the electronic device may power on a main processor of the electronic device when the network interface controller detects a beacon during the power on state that indicates the wireless access point has a buffered data frame for the electronic device.

Thus, by minimizing the amount of power consumed by an electronic device in acquiring or maintaining network connectivity with a network, the duration of the overall network connectivity of the electronic device with the network may be increased. Further, the power consumption minimization may also increase the battery longevity of the electronic device, resulting in additional convenience and productivity for the user of the electronic device.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
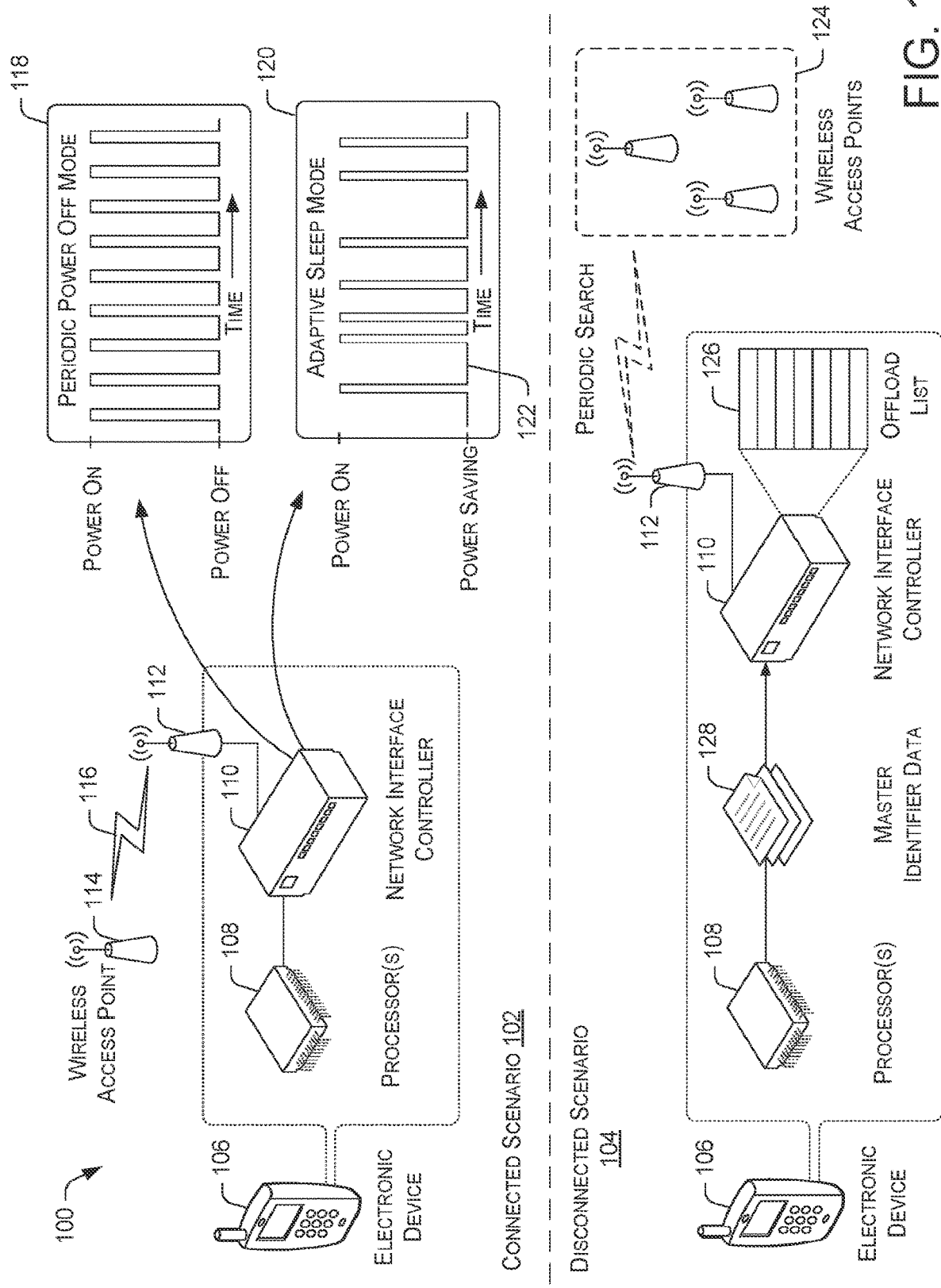
FIG. 1 is a block diagram that illustrates an example scheme that implements energy efficient network connectivity maximization for an electronic device in a connected scenario and a disconnected scenario.

Described herein are techniques for maximizing the network connectivity of an electronic device while minimizing the amount of power consumed by the electronic device in acquiring or maintaining the communication connection. The electronic device may be a mobile electronic device. The electronic device may use a Wi-Fi transceiver to connect to a network, such as the Internet. The wireless transceiver may be a wireless network interface controller (NIC) that includes a Wi-Fi radio. The electronic device may use the network interface controller and the main processor of the electronic device to not only communicate data over the network, but also to search for new wireless access points as the electronic device moves about a geographical region. Accordingly, the network interface controller and the main processor of the electronic device may consume considerable power while acquiring or maintaining network connectivity to the network.

In some embodiments, the techniques may reduce the power consumption of the network interface controller and the main processor of the electronic device while the electronic device is seeking to acquire network connectivity with a wireless access point. In such embodiments, the techniques may include selecting a list of wireless access points based on data related to a current usage context of the electronic device. Subsequently, the main processor of the electronic device may be powered off and the network interface controller may be placed in a power saving state. The network interface controller may then be periodically power on to search for one or more of the wireless access points in the list. The list may be periodically updated to adapt to changes in the usage context of the electronic device.

In other embodiments, the techniques may reduce the power consumption of the network interface controller and the main processor of the electronic device while the electronic device is engaged in an active communication connection with the network through a wireless access point. In some instances, the techniques may include powering off the main processor of the electronic device, and periodically cycling the network interface controller on and off. In such instances, a network stack of the electronic device may be configured to refrain from disconnecting the network connectivity with the wireless access point even during intervals in which the network interface controller is powered off.

In other instances, the techniques may include powering of the main processor of the electronic device, and placing the network interface controller into a power saving state for time intervals that vary according to a robustness of the communication connection between the ireless access point and the electronic device. In such instances, the robustness of the communication connection may be directly measured based on the signal strength of the communication signal emanating from the wireless access point that is acquired by the electronic device 106. Alternatively, the robustness of the communication connection may be indirectly measured by the proportions of data beacons transmitted by the wireless access point that failed to reach the electronic device.

Accordingly, by minimizing the amount of power consumed by an electronic device in acquiring or maintaining network connectivity with a network, the duration of the overall network connectivity of the electronic device with the network may be increased. Further, the power consumption minimization may also increase the battery longevity of the electronic device, resulting in additional convenience and productivity for the user of the electronic device. Various examples of techniques for implementing energy efficient network connectivity maximization in accordance with the embodiments are described below with reference to FIGS. 1-7.

Example Scheme

FIG. 1 is a block diagram that illustrates an example scheme 100 that implements energy efficient network connectivity maximization for an electronic device in a connected scenario 102 and a disconnected scenario 104. The electronic device 106 may be a general purpose computer, such as a tablet computer, a laptop computer, and so forth. However, in other embodiments, the electronic device 106 may be one of a smart phone, a game console, a personal digital assistant (PDA), or any other electronic device that is capable of interacting with a network via a network interface controller.

In various embodiments, the electronic device 106 may include at least one main processor 108 and a network interface controller 110, among other components. The main processor 108 may process input data that is inputted into the electronic device 106 or generated by another component of the electronic device 106 to produce output data. In turn, the output data may be presented to a user of the electronic device 106 or processed by another component of the electronic device 106. For example, in an instance in which the electronic device 106 is a smart phone, the main processor 108 may execute various applications that are stored in the smart phone so that the smart phone may perform communication and/or productivity functions.

The network interface controller 110 may enable the electronic device 106 to establish and carry out communication with other electronic devices over a network. In various embodiments, the network interface controller 110 may include a Wi-Fi radio 112 that provides the electronic device 106 with the ability to communicate with one or more wireless access points, such as a Wi-Fi wireless access point 114.

The electronic device 106 may operate in several different states. In an active state, the electronic device 106 may be processing data and carrying out functionalities. For example, in the instance in which the electronic device 106 is a smart phone, the electronic device 106 may be in the active state when the user is using the electronic device 106 to make a phone call, check email, browse a web site, compose a text message, and/or so forth.

However, the electronic device 106 may also frequently operate in a standby state. In the standby state, the electronic device 106 may be configured to minimize energy consumption while keeping the electronic device 106 ready to resume the active state. Nevertheless, the electronic device 106 may be often configured to perform tasks even in the standby state. In various scenarios, the main processor 108 and the network interface controller 110 may remain powered on in order to constantly seek out and/or maintain network connectivity with one or more WI-FI wireless access points, such as the wireless access point 114. In this way, communication data (e.g., emails, incoming VOIP call alerts, text messages) may be pushed to or pulled by applications on the electronic device 106 even when the electronic device 106 is in the standby state. However, such acquisition or maintenance of network connectivity in the standby state, especially when the electronic device 106 is a mobile device that moves between different Wi-Fi wireless access points, may dramatically decrease the battery life of the electronic device 106.

For example, during an establishment of a communication connection 116 with the wireless access point 114, the electronic device 106 may initially authenticate to the wireless access point 114. During authentication, the network interface controller 110 may send an authentication request to the wireless access point 114. The authentication request may include the station identifier of the electronic device 106 (e.g., MAC address of the network interface controller 110). In turn, the wireless access point 114 may answer with an authentication response message that indicates success or failure of the authentication.

In instances in which shared key authentication is implemented between the electronic device 106 and the wireless access point 114, the authentication may also include the passing of the shared key to the wireless access point 114. For example, such shared key may be a Wired Equivalent Privacy (WEP) key or a Wi-Fi Protected Access (WPA) key.

Once the authentication is completed, the network interface controller 110 may send an association request to the wireless access point 114 to gain access to the network. Upon receiving the association request, the wireless access point 114 may record the station identifier of the electronic device 106 (e.g., the MAC address of the network interface controller 110) so that data packets or frames may be delivered to the electronic device 106. For instance, when the wireless access point 114 grants association to the electronic device 106, the wireless access point 114 may respond to the electronic device 106 with a status code that indicates successful association, as well as an association ID (AID). Otherwise, the wireless access point 114 may respond to the electronic device 106 with an association failure status code.

Further during the association, the electronic device 106 and the wireless access point 114 may further establish a target beacon transmission time (TBTT) and/or a listen interval. In various embodiments, the wireless access point 114 may buffer data frames for the electronic device 106 so that the network interface controller 110 may cycle between a power saving state and a power on state to save energy without missing any buffered data frames from the wireless access point 114. While in the power saving state, the network interface controller 110 is not completely powered off, but is in an inactive state to conserve power. Further, the main processor 108 of the electronic 102 may be powered off while the network interface controller 110 is cycling between the power saving state and the power on state to further save energy.

The TBTT may be the time at which the wireless access point 114 sends a beacon to the electronic device 106. Each beacon may inform the electronic device 106 whether the wireless access point 114 has buffered a data frame for the electronic device 106. For example, the beacon may be a frame of data that includes a buffer status indicator, in which the buffer status indicator may have a value of "0" when no data frame is buffered, and a value of "1" when a data frame is buffered. Accordingly, the time difference between two TBTTs may be known as the beacon interval.

In turn, the network interface controller 110 of the electronic device 106 may provide a listen interval to the wireless access point 114. The listen interval may indicate to the wireless access point 114 the number of beacon intervals that the electronic device 106 desires to remain in the power saving state. Accordingly, the wireless access point 114 may be configured to hold a buffered data frame for at least the duration of the listen interval before discarding the data frame. In this way, the electronic device 106 may enter into the power saving state, and then periodically power on to check for beacons at regular intervals. Thus, if a received beacon does not indicate that a data frame is buffered, the network interface controller 110 may resume the power saving state until the next beacon check. However, if a received beacon does indicate that a data frame is buffered, the network interface controller 110 may remain powered on to receive the buffered data frame, and the network interface controller 110 may further trigger the main processor 108 to power on and process the received data frame.

Nevertheless, while the use of the TBTT and the listen intervals may provides some power saving benefits, additional power saving benefits may be realized from the use of a periodic power off mode 118 and/or an adaptive sleep mode 120 for the network interface controller 110 when the electronic device 106 is in the connected scenario 102. In the connected scenario 102, the electronic device 106 may have already established network connectivity with the wireless access point 114.

The periodic power off mode 118 is implemented when the electronic device 106 is in a standby state. For example, the user may put the electronic device 106 into the standby state by activating a sleep key of a user interface of the electronic device 106. During the periodic power off mode 118, the main processor 108 of the electronic device 106 may be powered off. Further, rather than cycling between the power saving state and the power on state to save energy, the network interface controller 110 may be alternatively powered on and powered off at regular intervals. Each of the power off durations may be longer than the listen interval that the network interface controller 110 established with the wireless access point 114 at an association phase.

Thus, by using these longer durations and completely powering off the network interface controller 110 rather than putting the controller in the power saving state in each of the durations, the periodic power off mode 118 may achieve greater power conservation than is possible with the use of TBTT and the listen intervals. However, because the network interface controller 110 is intermittently powered off, the electronic device 106 may miss beacons that indicate that the wireless access point 114 has buffered data frames for the electronic device 106. As a result, the wireless access point 114 may discard such buffered data frames that are intended for the electronic device 106.

Nonetheless, the possibility that the wireless access point 114 may discard one or more data frames during an interval when the network interface controller 110 is powered off may be offset by the communication redundancy of an application that sends the data frames. For example, the application may be a VOIP communication program on a network server that is alerting the electronic device 106 of an incoming call. Accordingly, the VOIP communication program may continuously sent out multiple incoming call alert data frames that are intended for the electronic device 106. The multiple incoming call alert data frames are buffered by the wireless access point 114. The electronic device 106 may fail to receive one or more buffered incoming call alert data frames before they are discarded by the wireless access point 114 due to the network interface controller 110 being powered off. However, the network interface controller 110 may eventually detect a beacon from the wireless access point 114 that indicates an incoming call alert data frame is buffered during a power on interval. The network interface controller 110 may subsequently receive the data frame and trigger the main processor 108 to process the data frame. Other examples of delay tolerant applications that compensate for the possibility of missed buffered data frames when the electronic device 106 is operating in the periodic power off mode 118 may include text messaging programs, email programs, and/or so forth. Accordingly, the periodic power off mode 118 may provide a viable way for the electronic device 106 to conserve additional energy during the connected scenario 102.

In other embodiments, the adaptive sleep mode 120 provides another way for the electronic device 106 to conserve additional energy during the connected scenario 102. In the adaptive sleep mode 120, the network interface controller 110 may establish, during an association with the wireless access point 114, a standard TBTT and a standard beacon interval. The network interface controller 110 may also establish a buffer duration for the wireless access point 114 to buffer each data frame that is multiple times the length (e.g., 10 times) of the beacon interval during the association.

Subsequently, in order to save power while maintaining the network connectivity with the wireless access point 114 when the electronic device 106 is in a standby state, the network interface controller 110 may be placed in a power saving state for multiple adaptive sleep intervals. Each of the adaptive sleep intervals (e.g., adaptive sleep interval 122) is a time between two power ups of the network interface controller 110 to listen for beacons, and may be stipulated to never exceed the buffer duration established with the wireless access point 114. Further, the network interface controller 110 may proportionally vary the length of each adaptive sleep interval based on the robustness of the communication connection 116 between the electronic device 106 and the wireless access point 114. Thus, the stronger the communication connection 116, the longer the adaptive sleep interval, while the weaker the communication connection 116, the shorter the adaptive sleep interval.

The variation of each adaptive sleep interval may be based on the principle that when the communication connection 116 is strong, the likelihood that the network interface controller 110 may fail to detect a beacon is small, so that the network interface controller 110 is more likely to afford to ignore some of the beacons that are sent out by the wireless access point 114 without missing a buffered data frame. On the other hand, when the communication connection 116 is weak, the likelihood that the network interface controller 110 may fail to detect a beacon becomes greater, so that the network interface controller 110 is less likely to afford to ignore some the beacons.

Thus, by using adaptive sleep intervals rather than fixed length listen intervals, the adaptive sleep mode 120 may enable the main processor 108 to be powered off and the network interface controller 110 to be placed in the power saving state for longer durations during the connected scenario 102.

While the periodic power off mode 118 and the adaptive sleep mode 120 may enable the electronic device 106 to obtain greater power savings during the connected scenario 102, they do not afford the electronic device 106 any power conservation benefits during the disconnected scenario 104. In the disconnected scenario 104, the electronic device 106 may be unconnected to any wireless access points, and is actively searching for wireless access points to establish network connectivity. Accordingly, the main processor 108 and the network interface controller 110 may be powered on and searching for available wireless access points.

As shown with respect to the disconnected scenario 104, the electronic device 106 may take advantage of Wi-Fi offloading to reduce energy consumption while searching for the available wireless access point 124. Wi-Fi offload enables a Wi-Fi offloading capable network interface controller, such as the network interface controller 110, to store selected wireless access point identifiers in an offload list 126 in the memory of the network interface controller. The wireless access point identifiers may be Wi-Fi Service Set Identifiers (SSIDs) or Wi-Fi Basic Service Set Identifier (BSSIDs). A SSID may be a public name of a wireless access point, while the BSSID may be a Media Access Control (MAC) address of a wireless access point. Accordingly, while a set of wireless access points may in some instances share a common SSID, each wireless access point generally has a unique BSSID. The wireless access point identifiers may be selected for storage in the offload list 126 by the main processor 108 of the electronic device 106, and stored into the offload list 126 by a network interface controller processor of the network interface controller 110. The wireless access point identifiers may be selected from master identifier data 128 based on the usage context of the electronic device 106. In various embodiments, the usage context may include a current location of the electronic device 106, a predicted location of the electronic device 106, a time of the day, upcoming events or appointments of the user indicated by a task management application on the electronic device 106, and/or so forth. The master identifier data 128 may include identifier information that is stored in the electronic device 106 and/or identifier information that is stored on an external server, such as a server at a data center that is in a computing cloud.

Once the selected wireless access point identifiers have been stored in the offload list 126, the main processor 108 may be powered off and the network interface controller 110 may be placed in a power saving state. Subsequently, the network interface controller 110 may be periodically powered on to search for one or more wireless access points that match the wireless access point identifiers. Thus, if the network interface controller 110 is able to discover a matching wireless access point, the network interface controller 110 may then trigger the main processor 108 to power on in order to establish network connectivity with the discovered wireless access point. In some embodiments, once the network connectivity is established, the electronic device 106 may enter the periodic power off mode 118 or the adaptive sleep mode 120. Otherwise, the network interface controller 110 may power off or go back into power saving state for a predetermined time interval until the next power on to search for one or more matching wireless access points.

Additionally, the main processor 108 may be periodically powered on to refresh the offload list 126 that is stored in the memory of the network interface controller 110. Each of the refreshments of the list may take into consideration any changes in the usage context of the electronic device 106. Thus, by taking advantage of an offloading capable network interface controller and using a network interface controller processor on the controller to discover available wireless access points, the electronic device 106 may further reduce power consumption by periodically powering off the main processor 108 of the electronic device 106 in the disconnected scenario 104.

In some embodiments, the network interface controller 110 may use a probabilistic data structure scheme to increase the number of wireless access point identifiers that are monitored for discovering matching wireless access points. For example, the memory capacity of the memory 206 that stores the offload list 126 may be limited to the storage of 10 wireless access identifiers. In such an example, the network interface controller 110 may use a Bloom filter to tradeoff false positives in exchange for the ability to store more than 10 wireless access identifiers in the same amount of memory 206 for monitoring by the network interface controller 110. As used herein, a false positive means that the network interface controller 110 may power on the main processor 108 even though a newly discovered identifier does not actually match one of the monitored wireless access identifiers stored in the memory 206. Thus, the tradeoff is between minimizing a false positive rate and maximizing a number of monitored wireless access point identifiers.

In such embodiments, the network interface controller 110 may implement the probabilistic data structure by maintaining a bit vector, and hashing the wireless access identifiers to be monitored using a set of hash functions. For each hash implemented using a hash function, the network interface controller 110 may flip a corresponding bit in the bit vector. Further, when a wireless access point is newly discovered by the network interface controller 110 during a search, the network interface controller 110 may hash an identifier of the newly discovered wireless access point. Following the hash, the network interface controller 110 may check whether the resulting corresponding bits are all "1"s. In the event that the corresponding bits are all "1"s, the network interface controller 110 may power on the main processor 108. It will be appreciated that having all the bits equal to "1" does not guarantee an exact match between the newly discovered wireless access point and a wireless access point identifier stored in the memory 206. Instead, such a result may indicate that there is a high probability that the newly discovered wireless access point matches a wireless access point identifier stored in the memory 206.

Electronic Device Components

Figure 2:
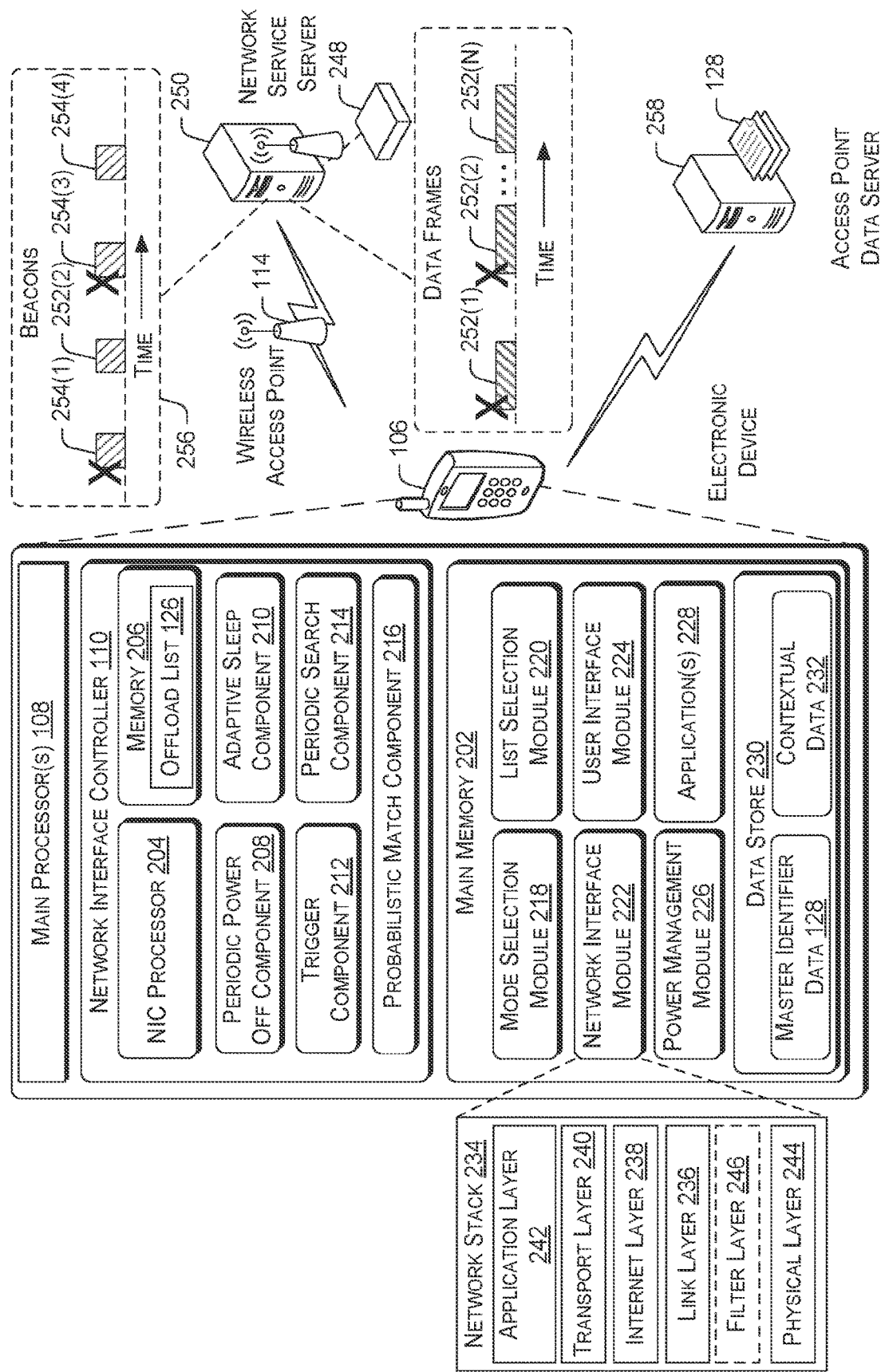
FIG. 2 is an illustrative diagram that shows example modules and components of the electronic device that minimizes power consumption during acquisition and maintenance of network connectivity with a wireless access point.

FIG. 2 is an illustrative diagram that shows example modules and components of the electronic device 106 that minimizes power consumption during acquisition and maintenance of network connectivity with a wireless access point. The electronic device 106 may includes at least one main processor 108, a network interface controller 110, main memory 202, and/or user controls that enable a user to interact with the electronic device. In turn, the network interface controller 110 may include a NIC processor 204, a memory 206, a periodic power off component 208, an adaptive sleep component 210, a trigger component 212, a periodic search component 214, and a probabilistic match component 216. The memory 206 may store the offload list 126, among other data. The components of the network interface controller 110 may use the NIC processor 204 to perform tasks and functionalities.

Each of the main memory 202 and memory 206 may be implemented using computer readable media, such as computer storage media. Computer-readable media includes, at least, two types of computer-readable media, namely computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by an electronic device. In contrast, communication media may embody computer readable instructions, data structures, program modules, or other data in a modulated data signal, such as a carrier wave, or other transmission mechanism. As defined herein, computer storage media does not include communication media.

The main memory 202 may store a mode selection module 218, a list selection module 220, a network interface module 222, a user interface module 224, a power management module 226, and one or more applications 228. Each of the modules may include routines, programs instructions, objects, scripts, and/or data structures that are executable by the main processor 108 to perform particular tasks or implement particular abstract data types.

The network interface controller 110 may use the periodic power off component 208 to implement the periodic power off mode 118. In various embodiments, the periodic power off component 208 may include hardware and/or software instructions that cycle the network interface controller 110 on and off at regular intervals in the connected scenario 104. In some embodiments, the software instructions may be stored in the memory 206. The network interface controller 110 may listen for beacons that indicate the presence or absence of buffered data frames from the wireless access point 114 during each power on interval of the network interface controller 110.

Accordingly, when the network interface controller 110 detects a beacon that indicates a data frame is buffered for the electronic device 106, the network interface controller 110 may receive the buffered data frame. Further, the trigger component 212 of the network interface controller 110 may also trigger the main processor 108 to power on and process the received data frame.

The proper operation of the periodic power off component 208 may be dependent on the configuration of the network interface module 222 in the main memory 202. The network interface module 222 may implement a hierarchical abstraction of a network stack 234 that includes, from bottom to top, a link layer 236, an Internet layer 238, a transport layer 240, and an application layer 242 that enables the electronic device 106 to receive and transmit data over a network. In at least one embodiment, the link layer 236 may be configured to prevent the rest of the network stack from disconnecting the electronic device 106 from the wireless access point 114, when the network interface controller 110 in an underlying physical layer 244 periodically powers off during the periodic power off mode 118. In other words, the link layer 236 may be configured to refrain from releasing an IP address that the network interface controller 110 has previously obtained from the wireless access point 114, and/or perform any other network connectivity termination activities that the link layer 236 would normally perform when the network interface controller 110 powers off.

In other embodiments, the network interface module 222 may implement an additional filter layer 246 in the network stack 234 beneath the link layer 236. The filter layer 246 may prevent the remaining layers in the network stack from becoming aware of the powering off of the network interface controller 110 during the periodic power off mode 118. For example, the filter layer 246 may block a media disconnect message initiated by the physical layer 244 from reaching the rest of the network stack 234 when the network interface controller 110 powers off. In this way, the link layer 236 may be prevented from releasing an IP address and/or perform other network connectivity termination activities.

As described above, the possibility that the wireless access point 114 may discard one or more data frames during an interval when the network interface controller 110 is powered off may be offset by communication redundancy of applications, such as the application 248, that send the data frames. The application 248 may reside on a service server 250. For example, the application 248 may be a VOIP communication program that continuously sent out multiple incoming call alert data frames 252(1)-252(N) that are intended for the electronic device 106. As such, the wireless access point 114 may discard one or more of the data frames 252(1)-252(N), such as the data frames 252(1)-252(2), because the network interface controller 110 was powered off. However, the network interface controller 110 may nevertheless receive the incoming call alert data frame 252(N) during a power on interval so that the user of the electronic device 106 does not miss the corresponding VOIP call.

The network interface controller 110 may use the adaptive sleep component 210 to implement the adaptive sleep mode 120. In various embodiments, the adaptive sleep component 210 may include hardware and/or software instructions that vary the adaptive sleep intervals of the network interface controller 110 during the adaptive sleep mode 120. The sleep intervals may be varied based on the robustness of the communication connection 116 between the electronic device 106 and the wireless access point 114. In some embodiments, the software instructions may be stored in the memory 206.

The robustness of the communication connection 116 may be assessed based on signal strength of the communication signal. As such, the adaptive sleep component 210 may measure the strength of the communication signal transmitted by the wireless access point 114 during the adaptive sleep mode 120. Accordingly, the stronger a strength of the communication signal, the longer the adaptive sleep interval that is implemented by the adaptive sleep component 210. Conversely, the weaker the strength of the communication signal, the shorter the adaptive sleep interval that is implemented by the adaptive sleep component 210.

In some embodiments, the duration of the adaptive sleep interval may be directly proportional to the strength of the communication signal transmitted by the wireless access point 114. For example, given that the data frame buffer duration of the wireless access point 114 is one second and the beacon interval is 100 milliseconds, the wireless access point 114 may transmit 10 beacons per second. In such an example, when the signal strength of the communication signal transmitted by the wireless access point 114 is 90% strength, the adaptive sleep component 210 may adopt 900 milliseconds as the adaptive sleep interval for the network interface controller 110. However, when the signal strength of the communication signal transmitted by the wireless access point 114 is 10% strength, the adaptive sleep component 210 may adopt 100 milliseconds as the adaptive sleep interval for the network interface controller 110.

Alternatively, the robustness of the communication connection 116 may be measured based on a beacon loss rate detected by the adaptive sleep component 210. The beacon loss rate may be a percentage of expected beacons that the network interface controller 110 failed to receive during a test interval. In one example, the adaptive sleep component 210 may have knowledge that the wireless access point 114 is configured to transmit four beacons 254(1)-254(4) in a test interval 256 of 400 milliseconds, i.e., a beacon every 100 milliseconds. However, the network interface controller 110 only received two beacons (e.g., beacons 254(2) and 254(4)) during the test interval. Based on these figures, the adaptive sleep component 210 may determine that the beacon loss rate is 50%.

Subsequently, after each test interval, the adaptive sleep component 210 may adjust the adaptive sleep interval based on the beacon loss rate during the test interval. In various embodiments, a higher beacon loss rate may result in a shorter adaptive sleep interval, while a lower beacon loss rate may result in a longer adaptive sleep interval. In at least one embodiment, the adaptive sleep interval may be inversely proportional to the beacon loss rate. For example, when the beacon loss rate is 10%, the adaptive sleep component 210 may adopt 900 milliseconds as the adaptive sleep interval for the network interface controller 110. However, when the signal strength of the communication signal transmitted by the wireless access point 114 is 90% on a standardized scale, the adaptive sleep component 210 may adopt 100 milliseconds as the adaptive sleep interval for the network interface controller 110.

In at least one embodiment, the adaptive sleep component 210 may conduct a beacon loss rate test following a power saving interval to determine the length of the next adaptive sleep interval. In this way, the adaptive sleep component 210 may adjust to changes in the robustness of the network connectivity between the electronic device 106 and the wireless access point 114.

However, when the network interface controller 110 detects a beacon that indicates a data frame is buffered for the electronic device 106, the network interface controller 110 may receive the buffered data frame. Further, the trigger component 212 of the network interface controller 110 may also trigger the main processor 108 to power on and process the received data frame.

The mode selection module 218 may enable the electronic device 106 to select the periodic power off mode 118 or the adaptive sleep mode 120 to implement by the network interface controller 110. Such a determination may be made when the electronic device 106 is to be placed in a standby state. The mode selection module 218 may make a determination as to which mode to implement based on the usage context of the electronic device 106. In various embodiments, the mode selection module 218 may command the network interface controller 110 to apply the adaptive sleep mode 120 when there is a high likelihood (e.g., over 50% likelihood) that the electronic device 106 is to be used again, i.e., powered on, within a particular period of time in the future. On the other hand, the mode selection module 218 may apply the periodic power off mode 118 when there is a low likelihood (e.g., 50% or less likelihood) that the electronic device 106 is to be powered on within the particular period of time in the future. This selection practice may be based on an observation that while the periodic power off mode 118 conserves more energy than the adaptive sleep mode 120, powering on the network interface controller 110 to resume network connectivity after powering off may take more time and processing overhead than power on the network interface controller 110 from a power saving state.

The mode selection module 218 may determine the likelihood that the electronic device 106 is to be powered on again within a particular period of time in the future based on usage context of the electronic device 106. Such usage context may include factors such as a time of day, a location of the electronic device 106 (e.g., home or office), a predicted location of the electronic device 106, the presence or absence of an appointment or an event noted in a task management application on the electronic device 106, prior usage patterns of the electronic device 106, and/or other relevant factors. In some embodiments, the mode selection module 218 may also have the ability to switch the electronic device 106 between the modes at a future time based on predicted usage context of the electronic device 106. For example, the mode selection module 218 may place the network interface controller 110 in the adaptive sleep mode 120 for the first 10 minutes after the user puts the electronic device 106 in a standby state, then switch the network interface controller 110 to the periodic power off mode 118 after the elapse of the 10 minutes, or vice versa.

The list selection module 220 may configure the network interface controller 110 to efficiently search for wireless access points 124 during the disconnected scenario 104. In operation, the list selection module 220 may select wireless access point identifiers for offloading to the network interface controller 110 from the master identifier data 128. The master identifier data 128 may include the identifiers of wireless access points that are available in various geographical regions. The identifiers of the master identifier data 128 may include SSIDs and/or BSSIDs. The master identifier data 128 may be stored on an access point data server 258 and/or in the data store 230 of the electronic device 106. The access point data server 258 may be a server that is a part of a computing cloud.

In various embodiments, the list selection module 220 may select identifiers from the master identifier data 128 based on contextual data 232 related to the electronic device 106. The contextual data 232 may include global positioning system (GPS) data that is supplied by a GPS component of the electronic device 106. The electronic device 106 may prompt the user for consent via the user interface module 224 prior to collecting the GPS data. The GPS data may provide information on a current location, direction of travel, speed of travel, road of travel, and/or so forth. Alternatively or concurrently, the contextual data 232 may also include historical data on wireless access points that the electronic device 106 connecting to, including the geographical locations of such wireless access points, durations of connectivity, and/or so forth.

In some embodiments, the contextual data 232 may also include information that is supplied by the applications 228 that are on the electronic device 106. Such information may include appointments or booked events of the user of the electronic device 106, travel plans of the user, and/or other scheduling information of the user that may be useful in projecting one or more future locations of the user.

Accordingly, the list selection module 220 may process the contextual data 232 to select identifiers for placement in the offload list 126. In some embodiments, the list selection module 220 may use a conditional probability algorithm to predict expected directions of travel, and in turn, expected locations of the electronic device 106, based on previously connected wireless access points of the electronic device 106.

In other embodiments, the list selection module 220 may use other machine learning and/or classification algorithms to predict locations of the electronic device 106 based on the contextual data 232. The machine learning algorithms may include supervised learning algorithms, unsupervised learning algorithms, semi-supervised learning algorithms, and/or so forth. The classification algorithms may include support vector machines, neural networks, expert systems, Bayesian belief networks, fuzzy logic, data fusion engine, and/or so forth. In additional embodiments, the list selection module 220 may employ one or more of directed and undirected model classification approaches, such as naïve Bayes. Bayesian networks, decision trees, neural networks, fuzzy logic models, and/or other probabilistic classification models.

Once the list selection module 220 has predicted a location for the electronic device 106, the list selection module 220 may select identifiers of wireless access points that correspond to the predicted location from the master identifier data 128. The list selection module 220 may further populate the offload list 126 with the identifiers of the corresponding wireless access points. The selection of the identifiers of wireless access points that correspond to a predicted location is illustrated in FIG. 3.

Figure 3:
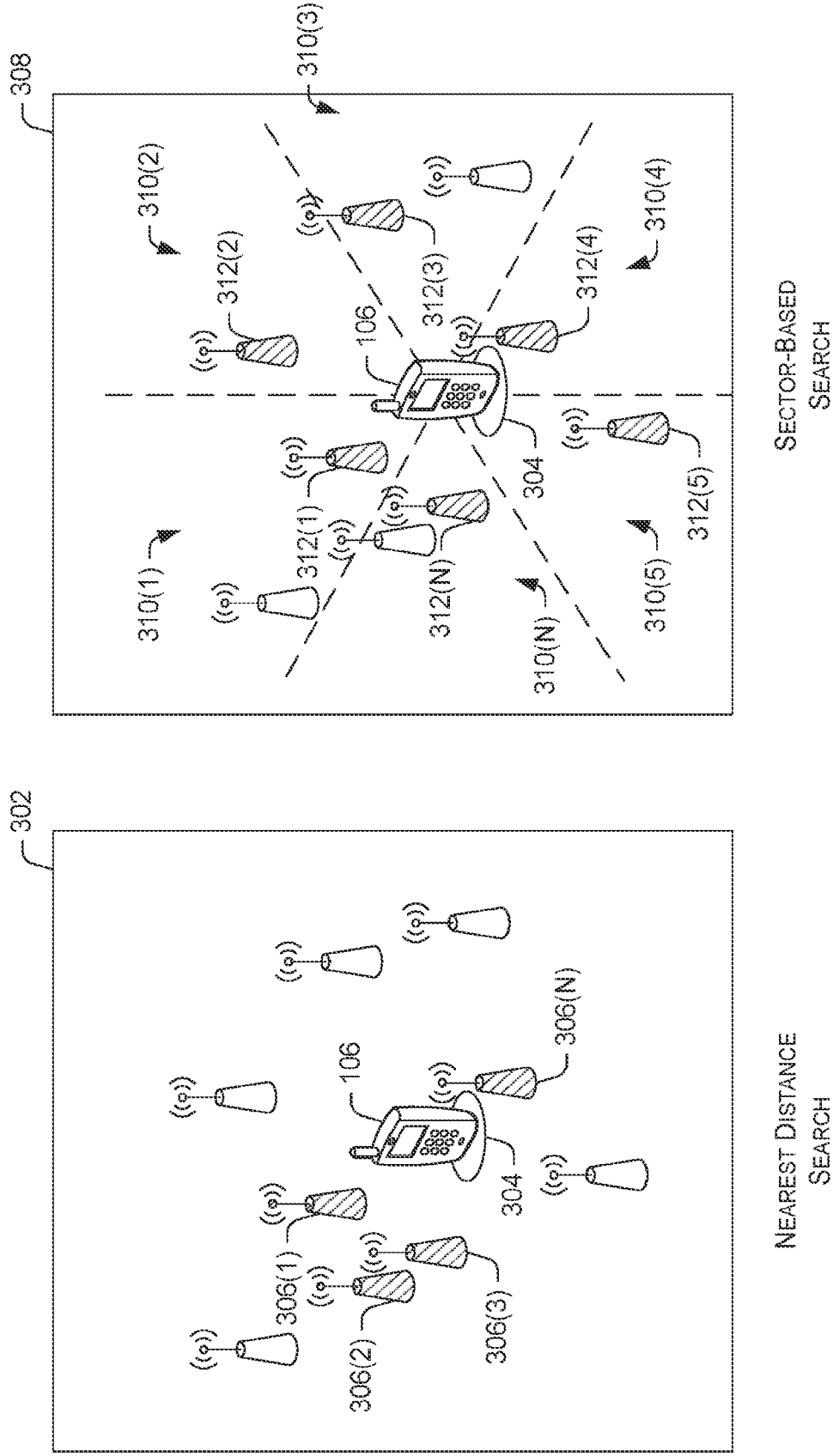
FIG. 3 is an illustrative diagram that shows search techniques employed by the electronic device that minimizes power consumption during a search for available wireless access points

FIG. 3 is an illustrative diagram that shows techniques employed by the electronic device 106 during a search for available wireless access points that correspond to a predicted location of the electronic device 106. In some embodiments, the list selection module 220 may use a nearest distance search 302 to select a predetermined number of identifiers from the master identifier data 128. The selected identifiers may belong to wireless access points that are closest to a predicted location 304 of the electronic device 106. For example, the list selection module 220 may select identifiers that belong to the wireless access points 306(1)-306(N) from identifiers of multiple wireless access points, as the wireless access points 306(1)-306(N) are closest to the predicted location 304.

In other embodiments, the list selection module 220 may use a sector-based search 308 to select a predetermined number of identifiers from the master identifier data 128. In the sector-based search 308, the list selection module 314 may divided a geographical region that surrounds the predicted location 304 of the electronic device 106 into multiple sectors, such as the sectors 310(1)-310(N). Accordingly, the list selection module 314 may select the identifiers of one or more wireless access points from each sector that is closest to the predicted location 304 of the electronic device 106. For example, the list selection module 220 may select identifiers that belong to the wireless access points 312(1)-312(N) from identifiers of multiple wireless access points. By selecting the identifiers of one or more wireless access points from each sector, the list selection module 220 may prevent the selection of identifiers of wireless access points that are clustered in a particular area. Instead, the list selection module 220 may distribute the selection across different compass directions. Such distribution may compensate for any errors with respect to the predicted location 304 of the electronic device 106 and/or a predicted direction of travel of the electronic device 106.

Return to FIG. 2, while in some embodiments every slot in the offload list 126 may be populated with identifiers of wireless access points that correspond to the predicted location of the electronic device 106, the slots in the offload list 126 may be populated differently in other embodiments. In such embodiments, while a number of the slots in the offload list 126 are populated with identifiers of wireless access points that correspond to a predicted location, the other slots may be populated with identifiers of popular wireless access points and/or identifiers of wireless access points that previously connected with the electronic device 106. The popular wireless access points may be selected by the access point data server 258 based on historical usage data collected from the wireless access point usage patterns of a plurality of users. In various embodiments, a popular wireless access point may be a wireless access point whose usage rate is greater than an average usage rate for a group of wireless access points, whose usage rate is greater than a threshold value, and/or whose usage rate is in a predetermined highest range of usage rates.

Further, the number of slots in the memory 206 may be constrained by the capacity of the memory 206. For example, when there are 32 slots in the offload list 126, the list selection module 220 may populate 22 of the slots with the identifiers of wireless access points that correspond to the predicted location, 5 of the slots with the identifiers of popular wireless access points, and 5 of the slots with the identifiers of wireless access points that previously connected with the electronic device 106.

Once the selected wireless access point identifiers have been stored in the offload list 126, the main processor 108 may be powered off and the network interface controller 110 may be placed in a power saving state. Subsequently, the periodic search component 214 may periodically powered on the network interface controller 110 so that the network interface controller 110 may search for one or more wireless access points that match the wireless access point identifiers in the offload list 126. In various embodiments, the periodic search component 214 may include hardware and/or software instructions that cycle the network interface controller 110 between a power on state and the power saving state in the disconnected scenario 104. In some embodiments, the software instructions may be stored in the memory 206.

Thus, if the network interface controller 110 is able to discover a matching wireless access point (e.g., wireless access point 114), the network interface controller 110 may then use the trigger component 212 to trigger the main processor 108 to power on in order to establish network connectivity with the discovered wireless access point. In instances in which multiple matching wireless access points are simultaneously detected, the electronic device 106 may select one of the multiple matching wireless access points based on one or more criteria. The one or more criteria may include strongest signal strength, histories of reliability, identities of the providers of the multiple wireless access points, and/or so forth. In some embodiments, once the network connectivity is established, the electronic device 106 may enter the periodic power off mode 118 or the adaptive sleep mode 120. Otherwise, if no matching wireless access point is discovered, the network interface controller 110 may go back into the power saving state for a predetermined time interval until the next power on to search for one or more matching wireless access points.

However, in alternative embodiments, rather than using the trigger component 212 to power on the main processor 108 to establish the network communication, the network interface controller 110 may have the ability to establish the communication connection with the detected wireless access point without the involvement of the main processor 108. Thus, in such embodiments, the network interface controller 110 may use the trigger component 212 to power on the main processor 108 after the communication connection with the detected wireless access point has been established.

In various embodiments, the network interface controller 110 may periodically cycle between the power saving state and actively searching for matching wireless identifiers in the power on state. The network interface controller 110 may do so until a number of failed scans, that is, failures to detect a matching wireless access point at each active search, reach a predetermined threshold value. The periodic search component 214 may track the number of such failed scans. At the point that the number of failed scans reaches the predetermined threshold value, the periodic search component 214 may power on the main processor 108 so that the list selection module 220 may select new identifiers from the master identifier data 128 based on contextual data 232 related to the electronic device 106. In this way, the identifiers in the offload list 126 may be refreshed based on the contextual data 232.

In some embodiments, the network interface controller 110 may use a probabilistic data structure scheme to increase the number of wireless access point identifiers that are stored in the memory 206 and monitored by the network interface controller 110. For example, the memory capacity of memory 206 that stores the offload list 126 may be limited to the storage of 10 wireless access identifiers. In such an example, the network interface controller 110 may use a Bloom filter to tradeoff false positives in exchange for the ability to storing more than 10 wireless access identifiers in the same amount of memory 206 for monitoring by the network interface controller 110.

In such embodiments, the probabilistic match component 216 may insert a set of SSIDs or BSSIDs into the memory 206 according to a Bloom filter. The set of SSIDs or BSSIDs may be selected by the list selection module 220. The insertion may be performed by maintaining a bit vector, and hashing the wireless access identifiers to be monitored using a set of hash functions. The probabilistic match component 216 may have the ability to implement hash functions using the NIC processor 204. In various embodiments, each of the hash functions may be a cryptographically-secure hash function or a hash function that is not cryptographically secure. For each hash implemented using a particular hash function, the probabilistic match component 216 may flip a corresponding bit in the bit vector. This insertion procedure may be illustrated by the following pseudocode:

```
initialize bitvector to 0
foreach s in SSID(BSSID)_List do
    foreach k in list_of_hash_functions do
        index = hash_k(s)
        bitvector[index] = 1
    endfor
endfor
```

Further, when a wireless access point is newly discovered by the network interface controller 110 during a search, the probabilistic matching component 214 may hash an identifier of the newly discovered wireless access point. Following the hash, the probabilistic matching component 214 may check whether the resulting corresponding bits are all "1"s. In the event that the corresponding bits are all "1"s, the probabilistic matching component 214 may use the trigger component 212 to power on the main processor 108. This matching procedure may be illustrated by the following pseudocode:

```
foreach k in list_of_hash_functions do
    index = hash_k(newSSID)
    if(0 == bitvector[i])
        return false;
endfor
return true;
```

As illustrated by the pseudocode, having all of the bits of the hash result equal to "1" does not guarantee an exact match between the newly discovered wireless access point and a wireless access point identifier stored in the memory 206. Instead, such a result may indicate that there is a high probability that the newly discovered wireless access point matches a wireless access point identifier stored in the memory 206.

The number of hash functions implemented by the probabilistic match component 216 to perform the insertion procedure and the matching procedure described above may be set to minimize the rate of false positives in the Bloom filter. For example, assuming that m is the size of the memory 206 in the network interface controller 110 (in bits) n is the number of SSIDs or BSSIDs to be monitored, and k is the number of hash functions utilized by the Bloom filter, the probability of a false positive may be expressed as:

$$\left(1 - \left[1 - \frac{1}{m}\right]^{kn}\right)k \quad (1)$$

which may be approximated as:

$$(1 - e^{-kn/m})k \quad (2)$$

Accordingly, in order to minimize the probability of a false positive, k may be set to:

$$\frac{m}{n} \ln 2.$$

Thus, in an example in which the memory 206 may hold up to 10 SSIDs of 32 bytes in length, then m may have a value of 10*32*8=2560 bits. Further, assuming that the probabilistic match component 216 is configured to monitor 100 SSIDs, then k may be set to (2560/100)*ln(2)≈17 to minimize the rate of false positives.

The user interface module 224 may enable a user to interact with the modules and component of the electronic device 106 using a user interface (not shown). The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

In various embodiments, the user interface module 224 may enable the user to power on and off the electronic device 106, place the electronic device 106 in the standby state, and reactivate the electronic device 106 from the standby state. Additionally, the user interface module 224 may also enable the user to interact with the applications 228 that are on the electronic device 106. The user interface module 224 may further enable the user to switch the network interface controller 110 between the periodic power off mode 118 and the adaptive sleep mode 120.

The power management module 226 may place the electronic device 106 in a standby state in response to an inactivation command. The inactivation command may be received from the user via the user interface module 224. The placement of the electronic device 106 in a standby state may include powering off the main processor 108 and initiating the mode selection module 218 to place the network interface controller 110 in the periodic power off mode 118 or the adaptive sleep mode 120. In other instances, the power management module 226 may place the electronic device 106 in the standby state when the main processor 108 is idle and the user interface module 224 and no input is received from the user for a predetermined amount of time. In additional instances, the power management module 226 may place the electronic device 106 in the standby state according to a pre-planned inactivation schedule. In some embodiments, the power management module 226 may also power off or place into power saving states other components of the electronic device 106, such as hard drives, GPS chips, display screens, and/or so forth.

The applications 228 may include applications that provide contextual data 232 to the mode selection module 218 and/or the list selection module 220. The applications 26 may include task management applications, email application, office productivity application, calendar applications, scheduling applications, travel planning applications, and/or so forth.

The data store 230 may store the inputs that are used by the modules and components of the electronic device 106. In at least one embodiment, the data store 230 may store the master identifier data 128, the contextual data 232, and/or so forth.

Example Processes

FIGS. 4-7 describe various example processes for implementing energy efficient network connectivity maximization. The order in which the operations are described in each example process is not intended to be construed as a limitation, and any number of the described operations can be combined in any order and/or in parallel to implement each process. Moreover, the operations in each of the FIGS. 4-7 may be implemented in hardware, software, and a combination thereof. In the context of software, the operations represent computer-executable instructions that, when executed by one or more processors, cause one or more processors to perform the recited operations. Generally, computer-executable instructions include routines, programs, objects, components, data structures, and so forth that cause the particular functions to be performed or particular abstract data types to be implemented.

Figure 4:
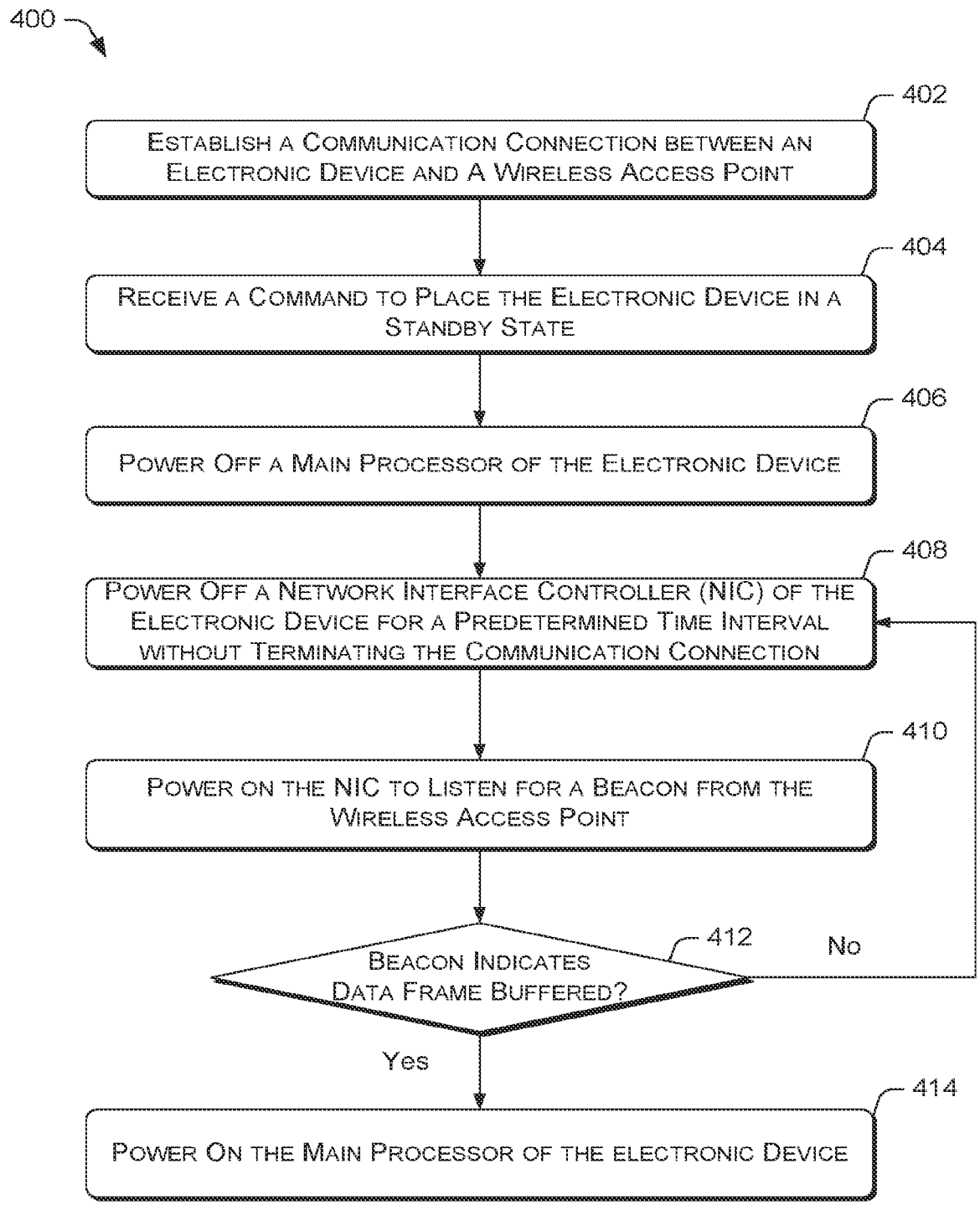
FIG. 4 is a flow diagram that illustrates an example process for implementing a periodic power off mode that periodically cycles a network interface controller of the electronic device on and off to reduce power consumption.

FIG. 4 is a flow diagram that illustrates an example process 400 for implementing a periodic power off mode that periodically cycles a network interface controller of the electronic device on and off to reduce power consumption.

At block 402, the electronic device 106 may establish a communication connection 116 with a wireless access point, such as the wireless access point 114. During the establishment of the communication connection 116, the electronic device 106 and the wireless access point 114 may further establish a TBTT and/or a listen interval. The communication connection 116 may be a Wi-Fi connection that is established with a Wi-Fi wireless access point.

At block 404, the electronic device 106 may receive a command to become inactivated. In some embodiments, the user may use the user interface of the electronic device 106 to place the electronic device 106 in a standby state. In other embodiments, the electronic device 106 may place itself in the standby state when the main processor 108 is idle and there is a lack of input from the user for a predetermined amount of time, or according to a pre-planned inactivation schedule.

At block 406, the power management module 226 may power off the main processor 108 in response to the inactivation command. The powering off of the main processor 108 may provide significant reduction in the amount of energy that is consumed by the electronic device 106.

At block 408, the periodic power off component 208 may power off the network interface controller 110 of the electronic device 106 for a predetermined time interval without terminating the communication connection 116 with the wireless access point 114. In various embodiments, the power management module 226 may rely on a modified link layer 236 or an additional filter layer 246 of the network stack 234 to maintain the communication connection 116 during the predetermined time interval.

At block 410, the periodic power off component 208 may power on the network interface controller 110 to listen for a beacon from the wireless access point 114. The beacon may include a buffer status indicator that indicates whether the wireless access point 114 has buffered a data frame for the electronic device 106. For example, the buffer status indicator may have a value of "0" when no data frame is buffered and a value of "1" when a data frame is buffered.

At decision block 412, the network interface controller 110 may determine whether the beacon indicates that a data frame is buffered by the wireless access point 114. Thus, if the beacon indicates that the wireless access point 114 has buffered a data frame for the electronic device 106 ("yes" at decision block 412), the process 400 may proceed to block 414.

At block 414, the network interface controller 110 may receive the buffered data frame from the wireless access point 114. Further, the periodic power off component 208 may use the trigger component 212 to power on the main processor 108 to process the received data frame. However, if the beacon indicates that no data packet is buffered for the electronic device 106, the process 400 may loop back to block 408, so that the periodic power off component 208 may once again power off the network interface controller 110 for the predetermined time interval without terminating the communication connection 116 with the wireless access point 114.

As described above, the possibility that the wireless access point 114 may discard one or more data frames during an interval when the network interface controller 110 is powered off may be offset by communication redundancy of a delay tolerant application 248. The delay tolerant application 238 may send out redundant data frames that are eventually received by the network interface controller 110.

Figure 5:
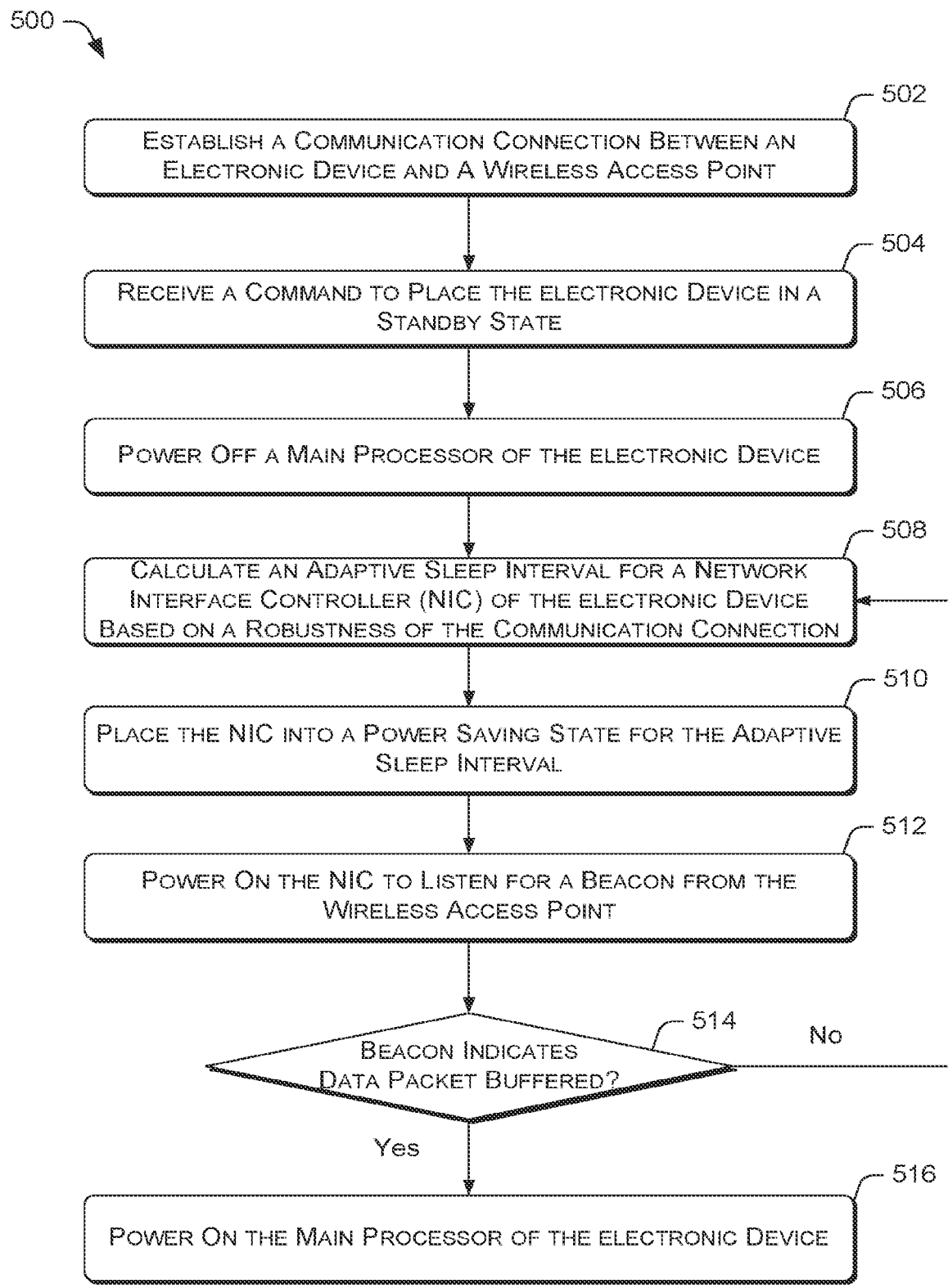
FIG. 5 is a flow diagram that illustrates an example process for implementing an adaptive sleep mode that places the network interface controller of the electronic device into a power saving state for varying time intervals to reduce power consumption.

FIG. 5 is a flow diagram that illustrates an example process 500 for implementing an adaptive sleep mode that places the network interface controller of the electronic device 106 into a power saving state for varying time intervals to reduce power consumption.

At block 502, the electronic device 106 may establish a communication connection 116 with a wireless access point, such as the wireless access point 114. During the establishment of the communication connection 116, the electronic device 106 and the wireless access point 114 may further establish a target beacon transmission time (TBTT) and/or a listen interval. The communication connection 116 may be a Wi-Fi connection that is established with a Wi-Fi wireless access point.

At block 504, the electronic device 106 may receive a command to become inactivated. In some embodiments, the user may use the user interface of the electronic device 106 to place the electronic device 106 in a standby state. In other embodiments, the electronic device 106 may place itself in the standby state when the main processor 108 is idle and there is a lack of input from the user for a predetermined amount of time, or according to a pre-planned inactivation schedule.

At block 506, the power management module 226 may power off the main processor 108 in response to the inactivation command. The powering off of the main processor 108 may provide significant reduction in the amount of energy that is consumed by the electronic device 106.

At block 508, the adaptive sleep component 210 may calculate an adaptive sleep interval for the network interface controller 110 of the electronic device 106.

The adaptive sleep interval may be calculated based on robustness of the communication connection 116 between the electronic device 106 and the wireless access point 114. In various embodiments, the adaptive sleep interval is the time of the power saving state between two power ups of the network interface controller 110 to listen for beacons. The adaptive sleep interval may be calculated based on signal strength of the communication signal emanating from the wireless access point that is acquired by the electronic device 106. Alternatively, the adaptive sleep interval may be calculated based on a beacon loss rate.

At block 510, the adaptive sleep component 210 may place the network interface controller 110 into a power saving state for the adaptive sleep interval. The power saving state may further reduce the amount of energy that is consumed by the electronic device 106.

At block 512, the adaptive sleep component 210 may power on the network interface controller 110 to listen for a beacon from the wireless access point 114. The beacon may include a buffer status indicator that indicates whether the wireless access point 114 has buffered a data frame for the electronic device 106. For example, the buffer status indicator may have a value of "0" when no data frame is buffered and a value of "1" when a data frame is buffered.

At decision block 514, the network interface controller 110 may determine whether the beacon indicates that a data frame is buffered by the wireless access point 114. Thus, if the beacon indicates that the wireless access point 114 has buffered a data frame for the electronic device 106 ("yes" at decision block 514), the process 500 may proceed to block 514.

At block 514, the network interface controller 110 may receive the buffered data frame from the wireless access point 114. Further, the adaptive sleep component 210 may use the trigger component 212 to power on the main processor 108 of the electronic device to process the received data frame. However, if the beacon indicates that no data packet is buffered for the electronic device 106, the process 500 may loop back to block 508, so that the adaptive sleep component 210 may calculate another adaptive sleep interval for the network interface controller 110 of the electronic device 106.

Figure 6:
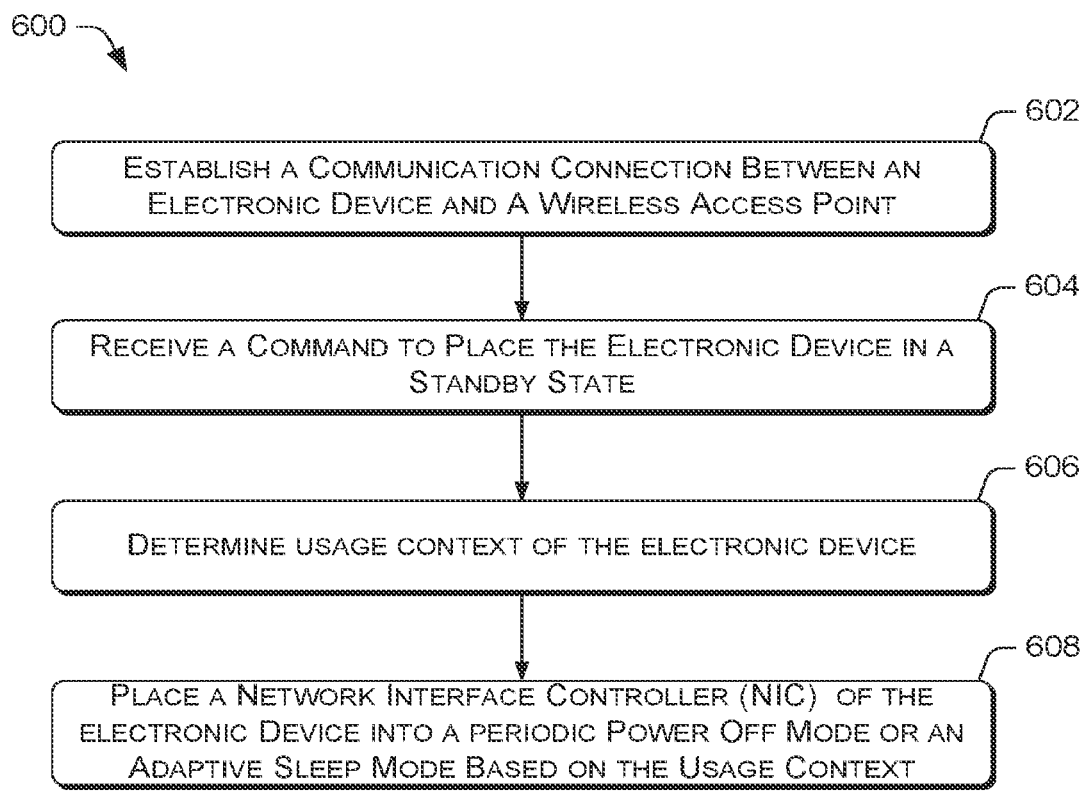
FIG. 6 is a flow diagram that illustrates an example process for determining whether to place the electronic device into the periodic power off mode or the adaptive sleep mode based on usage context of the electronic device.

FIG. 6 is a flow diagram that illustrates an example process 600 for determining whether to place the electronic device into the periodic power off mode or the adaptive sleep mode based on usage context of the electronic device.

At block 602, the electronic device 106 may establish a communication connection 116 with a wireless access point, such as the wireless access point 114. The communication connection 116 may be a Wi-Fi connection that is established with a Wi-Fi wireless access point.

At block 604, the electronic device 106 may receive a command to become inactivated. In some embodiments, the user may use the user interface of the electronic device 106 to place the electronic device 106 in a standby state. In other embodiments, the electronic device 106 may place itself in the standby state when the main processor 108 is idle and there is a lack of input from the user for a predetermined amount of time, or according to a pre-planned inactivation schedule.

At block 606, the mode selection module 218 may determine a usage context of the electronic device 106. The usage context may indicate the likelihood that the electronic device 106 is to be powered on again within a particular period of time in the future. The usage context may include factors such as a time of day, a location of the electronic device 106 (e.g., home or office), a predicted location of the electronic device 106, the presence or absence of an appointment or an event noted in a task management application stored in the main memory 202, prior usage patterns of the electronic device 106, and/or other relevant factors.

At block 608, the mode selection module 218 may place the network interface controller 110 of the electronic device 106 into the periodic power off mode 118 or the adaptive sleep mode 120 based on the usage context. In various embodiments, the mode selection module 218 may command the network interface controller 110 to enter the adaptive sleep mode 120 when the usage context indicates that there is a high likelihood (e.g., over 50% likelihood) that the electronic device 106 is to be used again, i.e., powered on, within a particular period of time in the future. On the other hand, the mode selection module 218 may apply the periodic power off mode 118 to the network interface controller 110 when the usage context indicates that there is a low likelihood (e.g., 50% or less likelihood) that the electronic device 106 is to be powered on within the particular period of time in the future.

Figure 7:
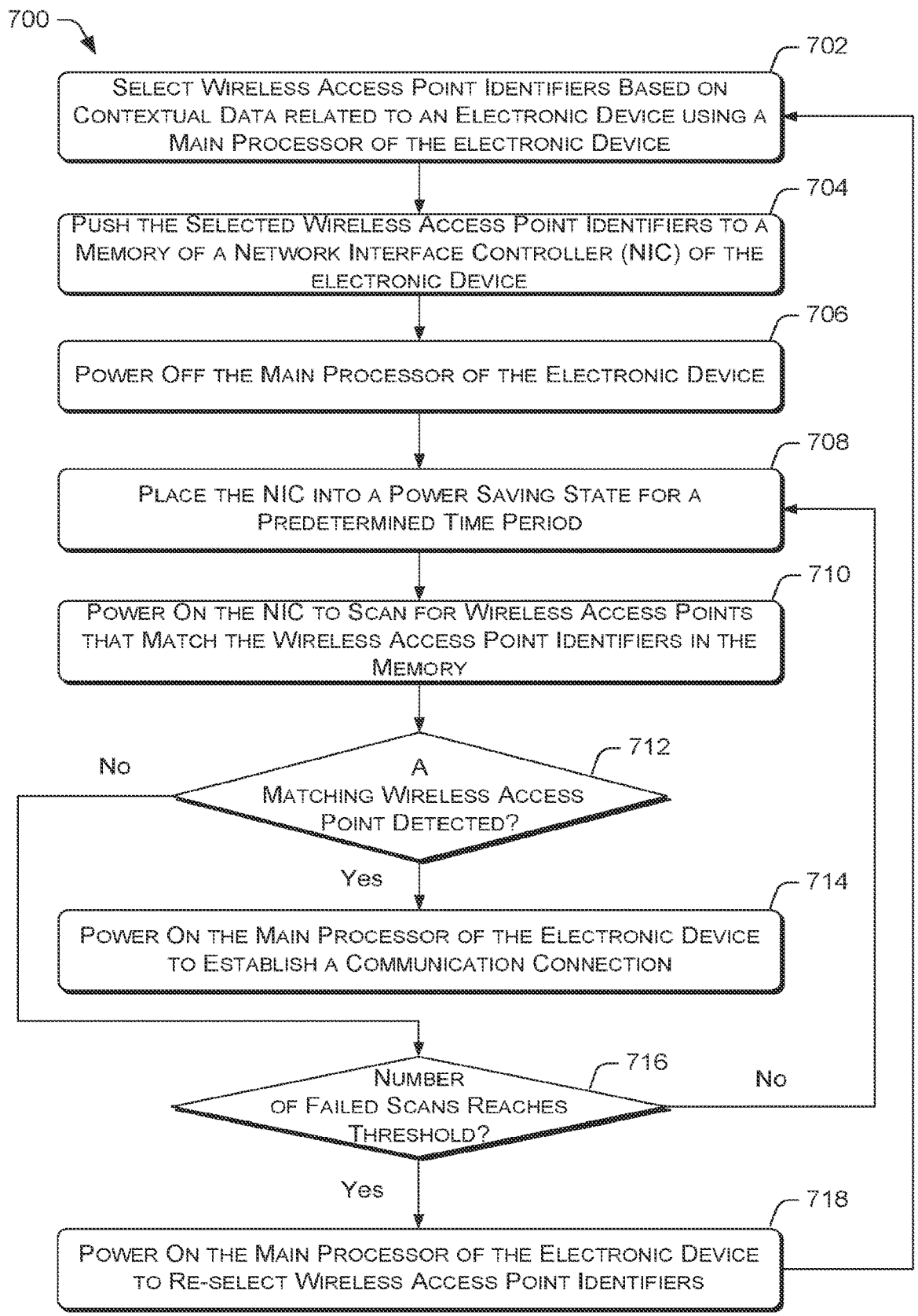
FIG. 7 is a flow diagram that illustrates an example process for reducing power consumption by periodically powering on the network interface controller to search for one or more wireless access points that are pre-selected based on contextual data.

FIG. 7 is a flow diagram that illustrates an example process 700 for reducing power consumption by periodically powering on the network interface controller 110 to search for one or more wireless access points 124 that are preselected based on contextual data.

At block 702, the list selection module 220 may select wireless access point identifiers from the master identifier data 128 based on contextual data 232 related to the electronic device 106. The selection may be made by the main processor 108 of the electronic device 106. In some embodiments, the list selection module 220 may use a conditional probability algorithm to predict the expected directions of travel, and in turn, the expected locations of the electronic device 106, based on previously connected wireless access points of the electronic device 106. In additional embodiments, the list selection module 220 may use other machine learning and/or classification algorithms to predict locations of the electronic device 106 based on the contextual data 232. Once the list selection module 220 has predicted a location for the electronic device 106, the list selection module 220 may select identifiers of wireless access points that correspond to the predicted location from the master identifier data 128.

In further embodiments, in addition to selecting wireless access point identifiers based on contextual data 232, the list selection module 220 may also select identifiers of popular wireless access points and/or identifiers of wireless access points that previously connected with the electronic device 106.

At block 704, the list selection module 220 may push the selected wireless access point identifiers to the memory 206. The memory 206 is located in the network interface controller 110 of the electronic device 106. In some embodiments, the selected wireless access point identifiers may be stored in the offload list 126. In other embodiments, the selected wireless access point identifiers may be stored in a probabilistic data structure in the memory 206 (e.g., Bloom filter).

At block 706, the power management module 226 may power off the main processor 108 in response to the inactivation command. The powering off of the main processor 108 may provide significant reduction in the amount of energy that is consumed by the electronic device 106.

At block 708, the periodic search component 214 may place the network interface controller 110 into a power saving state for a predetermined time period. The power saving state may further reduce the amount of energy that is consumed by the electronic device 106.

At block 710, the periodic search component 214 may power on the network interface controller 110 to scan for wireless access points that match wireless access point identifiers in the memory 206. At decision block 712, the network interface controller 110 may determine whether a matching access point is detected. In some embodiments, the match may be an absolute match in the instances in which the wireless access point identifiers are stored in the offload list 126. In other embodiments, the match may be a high probability match rather than an absolute match in instances in which the wireless access identifiers are stored in the probabilistic data structure (e.g., Bloom filter). Thus, if a matching wireless access point is detected ("yes" at decision block 712), the process 700 may proceed to block 714.

At block 714, the network interface controller 110 may use the trigger component 212 to power on the main processor 108 of the electronic device 106 to establish connectivity with the detected wireless access point. In instances in which multiple matching wireless access points are simultaneously detected, the electronic device 106 may select one of the multiple matching wireless access points based on one or more criteria. The one or more criteria may include strongest signal strength, histories of reliability, identities of the providers of the multiple wireless access points, and/or so forth.

However, if at decision block 712 the network interface controller 110 determines that no matching wireless access is detected ("no" at decision block 712), the process 700 may proceed to decision block 716. At decision block 716, the periodic search component 214 may determine whether the number of failed scans has reached a threshold value. Thus, if the number of failed scans has not reached the threshold value ("no" at decision block 716), the process 700 may loop back to block 708 so that the network interface controller may once again placed into a power saving state for the predetermined time period.

However, if the periodic search component 214 determines that the number of failed scans has reached the threshold value ("yes" at decision block 716), the process 700 may continue to block 718. At block 718, the periodic search component 214 may use the trigger component 212 to power on the main processor 108 of the electronic device 106 and re-select the wireless access point identifiers. Subsequently, the process 700 may loop back to block 702 so that the list selection module 220 may once again select wireless access point identifiers from the master identifier data 128 based on contextual data 232 related to the electronic device 106.

Thus, by minimizing the amount of power consumed by an electronic device in acquiring or maintaining network connectivity with a network, the duration of the overall network connectivity of the electronic device with the network may be increased. Further, the power consumption minimization may also increase the battery longevity of the electronic device, resulting in additional convenience and productivity for the user of the electronic device.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

What is claimed is:

1. An electronic device comprising:
a main processor;
a network interface controller (NIC) that includes a NIC processor and NIC memory; and
a main memory that includes machine-readable instructions, which when executed by the electronic device, configures the electronic device to:
select, by the main processor, a wireless access point (WAP) identifier of a first WAP for inclusion in a list of WAP identifiers and populate the NIC memory with the list of WAP identifiers; and
before scanning for a second WAP having a WAP identifier that matches one in the list of WAP identifiers and while the electronic device is connected to a third WAP in the list of WAP identifiers, power off the main processor and the NIC processor in response to population of the NIC memory with the list of WAP identifiers.

2. The electronic device of claim 1, wherein each WAP identifier in the list of WAP identifiers is one of a Service Set Identifier (SSID) or a Basic Service Set Identifier (BSSID) of a corresponding WAP.

3. The electronic device of claim 1, wherein the NIC is configured to, while the main processor is powered off and the electronic device is connected to the WAP, periodically cycle the NIC between a power on state and a power off state, the NIC processor configured to perform a scan for a beacon that indicates a WAP has a buffered data frame for the electronic device while in the power on state.

4. The electronic device of claim 1, wherein the NIC is configured to power on the main processor at least when the NIC detects a particular WAP that matches a corresponding WAP identifier in the NIC memory.

5. The electronic device of claim 4, wherein the NIC is configured to power on the main processor when (1) the NIC detects the particular WAP that matches the corresponding WAP identifier; and (2) the NIC establishes a communication connection with the particular WAP.

6. The electronic device of claim 4, wherein the NIC is further configured to power on the main processor to select another list of WAP identifiers based at least on contextual data related to the electronic device when a number of performed scans in which the NIC fails to detect a matching WAP reaches a predetermined threshold.

7. The electronic device of claim 6, wherein the contextual data includes appointment or schedule data provided by an application on the electronic device.

8. The electronic device of claim 1, wherein the NIC is configured to:
insert data representing a set of WAP identifiers into the NIC memory and determine, using a hash function, a match between a wireless access point and one of the WAP identifiers in the set is probable, wherein an amount of WAP identifiers in the data representing the set of WAP identifiers is greater than a number of identifier slots available in the NIC memory.

9. The electronic device of claim 1, wherein the machine-readable instructions, which when executed by the electronic device, further configure the electronic device to populate the list of WAP identifiers with at least one of an identifier of a WAP that previously connected with the electronic device.

10. The electronic device of claim 1, wherein the machine-readable instructions, when executed by the electronic device, further configure the electronic device to, while the main processor is powered on, calculate an adaptive sleep interval for the NIC processor, the adaptive sleep interval including time intervals that vary according to a robustness of the communication connection between the WAP and the electronic device and cycle the NIC processor between the power on state and the power off state based on the calculated adaptive sleep interval.

11. The electronic device of claim 10, wherein the NIC processor is configured to perform a scan for a beacon that indicates a WAP has a buffered data frame for the electronic device while in the power on state.

12. The electronic device of claim 11, wherein the robustness of the communication connection includes a signal strength of a communication received at the electronic device from the WAP.

13. The electronic device of claim 11, wherein the robustness of the communication connection includes a proportion of data beacons transmitted by the WAP that failed to reach the electronic device.

14. A method of performing operations on an electronic device, the electronic device including a main processor, main memory, and a network interface controller (NIC), the NIC including a NIC processor and a NIC memory, the method comprising:
selecting, by the main processor, a wireless access point (WAP) identifier of a first WAP for inclusion in a list of WAP identifiers based at least on contextual data related to the electronic device;
populating the list of WAP identifiers with the selected WAP identifier; and
before scanning for a second WAP having a WAP identifier that matches one in the list of WAP identifiers and while the electronic device is connected to a third WAP in the list of WAP identifiers powering off the main processor and the NIC processor of the electronic device in response to population of the NIC memory with the list of WAP identifiers.

15. The method of claim 14, wherein each WAP identifier in the list of WAP identifiers is one of a Service Set Identifier (SSID) or a Basic Service Set Identifier (BSSID) of a corresponding WAP.

16. The method device of claim 14, further comprising:
while the main processor is powered off and the electronic device is connected to the WAP, periodically cycling the NIC between a power on state and a power off state; and
scanning, by the NIC processor, for a beacon that indicates a WAP has a buffered data frame for the electronic device while in the power on state.

17. The method of claim 14, further comprising, powering on the main processor when the NIC detects a particular WAP that matches a corresponding WAP identifier in the NIC memory.

18. The method of claim 17, further comprising powering on the main processor when (1) the NIC detects the particular WAP that matches the corresponding WAP identifier; and (2) the NIC establishes a communication connection with the particular WAP.

19. The method of claim 17, further comprising powering on the main processor to select another list of WAP identifiers based at least on contextual data related to the electronic device when a number of performed scans in which the NIC fails to detect a matching WAP reaches a predetermined threshold.

20. The method of claim 14, further comprising:
while the main processor is powered on, calculating an adaptive sleep interval for the NIC processor, the adaptive sleep interval including time intervals that vary according to a robustness of the communication connection between the WAP and the electronic device; and
cycling the NIC processor between the power on state and the power off state based on the calculated adaptive sleep interval.

* * * * *